United States Patent
Yuan et al.

(10) Patent No.: US 11,954,295 B2
(45) Date of Patent: Apr. 9, 2024

(54) TOUCH PANEL, DISPLAY PANEL, AND DISPLAY DEVICE

(71) Applicant: Hefei Visionox Technology Co., Ltd., Anhui (CN)

(72) Inventors: Binbin Yuan, Hefei (CN); Qi Zhou, Hefei (CN); Jiaoyang Li, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 0 days.

(21) Appl. No.: 18/324,367

(22) Filed: May 26, 2023

(65) Prior Publication Data

US 2023/0297201 A1 Sep. 21, 2023

Related U.S. Application Data

(63) Continuation of application No. PCT/CN2021/130385, filed on Nov. 12, 2021.

(30) Foreign Application Priority Data

Jan. 25, 2021 (CN) .......................... 202120221234.4

(51) Int. Cl.
*G06F 3/045* (2006.01)
*G06F 3/041* (2006.01)
*G06F 3/044* (2006.01)

(52) U.S. Cl.
CPC .......... *G06F 3/0446* (2019.05); *G06F 3/0412* (2013.01); *G06F 3/0445* (2019.05); *G06F 2203/04111* (2013.01)

(58) Field of Classification Search
CPC ...... G06F 3/041; G06F 3/0412; G06F 3/0445; G06F 3/0446; G06F 2203/04111; H10K 59/12; H10K 59/40
See application file for complete search history.

(56) References Cited

U.S. PATENT DOCUMENTS 9,293,730 B2 * 3/2016 An ........................ H10K 77/111
10,185,430 B2 * 1/2019 Zhu ........................ H10K 59/40
(Continued)

FOREIGN PATENT DOCUMENTS

CN 106919290 A 7/2017
CN 109343746 A 2/2019
(Continued)

OTHER PUBLICATIONS

International Search Report dated Feb. 10, 2022, in corresponding International Patent Application No. PCT/CN2021/130385, 5 pages.

*Primary Examiner* — Joe H Cheng
(74) *Attorney, Agent, or Firm* — Maier & Maier, PLLC

(57) ABSTRACT

A touch panel, a display panel, and a display device. The touch panel includes: a substrate; an electrode layer disposed on the substrate. The electrode layer includes a plurality of second electrodes and a plurality of first electrodes arranged to intersect with the second electrodes; and an insulating layer. The second electrodes and the first electrodes are insulated by the insulating layer, and the insulating layer includes an inorganic material layer and an organic material layer. The inorganic material layer is provided with openings at least corresponding to intersections of the second electrodes and the first electrodes, and a part of the organic material layer fills in the openings.

16 Claims, 3 Drawing Sheets

(56) References Cited

U.S. PATENT DOCUMENTS

| | | | | |
|---|---|---|---|---|
| 10,361,385 B2* | 7/2019 | Choi | ............... | H10K 50/844 |
| 10,636,848 B2* | 4/2020 | Shen | ............... | H10K 50/82 |
| 11,099,671 B2* | 8/2021 | Chen | ............... | G06F 3/0412 |
| 11,696,480 B2* | 7/2023 | Zhang | ............... | G06F 3/0446 |
| | | | | 257/40 |
| 2016/0336523 A1* | 11/2016 | Kwon | ............... | H10K 50/865 |
| 2017/0003800 A1 | 1/2017 | Zhu | | |
| 2020/0127220 A1* | 4/2020 | Kim | ............... | H10K 50/11 |
| 2023/0232692 A1* | 7/2023 | Zhou | ............... | H10K 59/131 |
| | | | | 257/40 |
| 2023/0418407 A1* | 12/2023 | Zhou | ............... | G06F 3/04164 |

FOREIGN PATENT DOCUMENTS

| | | | |
|---|---|---|---|
| CN | 110750176 A | | 2/2020 |
| CN | 111352531 A | * | 6/2020 |
| CN | 111352531 A | | 6/2020 |
| CN | 213814635 U | | 7/2021 |
| JP | 2019175788 A | * | 10/2019 |

* cited by examiner

TOUCH PANEL, DISPLAY PANEL, AND DISPLAY DEVICE

CROSS-REFERENCE TO RELATED APPLICATION

The present application is a continuation of International Application No. PCT/CN2021/130385 filed on Nov. 12, 2021, which claims priority to Chinese Patent Application No. 202120221234.4, filed on Jan. 25, 2021 and entitled "TOUCH PANEL, DISPLAY PANEL, AND DISPLAY DEVICE", both of which are hereby incorporated by reference in their entireties.

TECHNICAL FIELD

The present application relates to a technical field of display, and in particular to a touch panel, a display panel, and a display device.

BACKGROUND

With the development of display technology and the popularization of electronic products, people have higher and higher functional requirements for display panels. Bendable display panels are the current trend of display industry technology and market, and most of them are integrated with touch function. Therefore, the bendable touch panels arise at the historic moment.

For the existing touch panel with bendable performance, during the bending test, the bending region of the touch panel will bear a large tensile stress, which is prone to the problem of breakage of the electrode wire, thereby leading to the problem of the touch function failure of the touch panel.

SUMMARY

The embodiments of the present application provide a touch panel, a display panel, and a display device.

In an aspect, an embodiment of the present application provides a touch panel, including: a substrate; an electrode layer disposed on the substrate, wherein the electrode layer includes a plurality of second electrodes and a plurality of first electrodes arranged to intersect with the second electrodes; an insulating layer, wherein the second electrodes and the first electrodes are insulated by the insulating layer, and the insulating layer includes an inorganic material layer and an organic material layer, wherein the inorganic material layer is provided with openings at least corresponding to intersections of the second electrodes and the first electrodes, and a part of the organic material layer fills in the openings.

In another aspect, an embodiment of the present application provides a display panel including an array substrate, a light emitting device layer, a packaging layer, and the touch panel according to the above embodiments, wherein the array substrate, the light emitting device layer, the packaging layer, and the touch panel are stacked; the touch panel is arranged in contact with the packaging layer through the substrate.

In yet another aspect, an embodiment of the present application provides a display device including the display panel according to the above embodiments.

Figure 1:
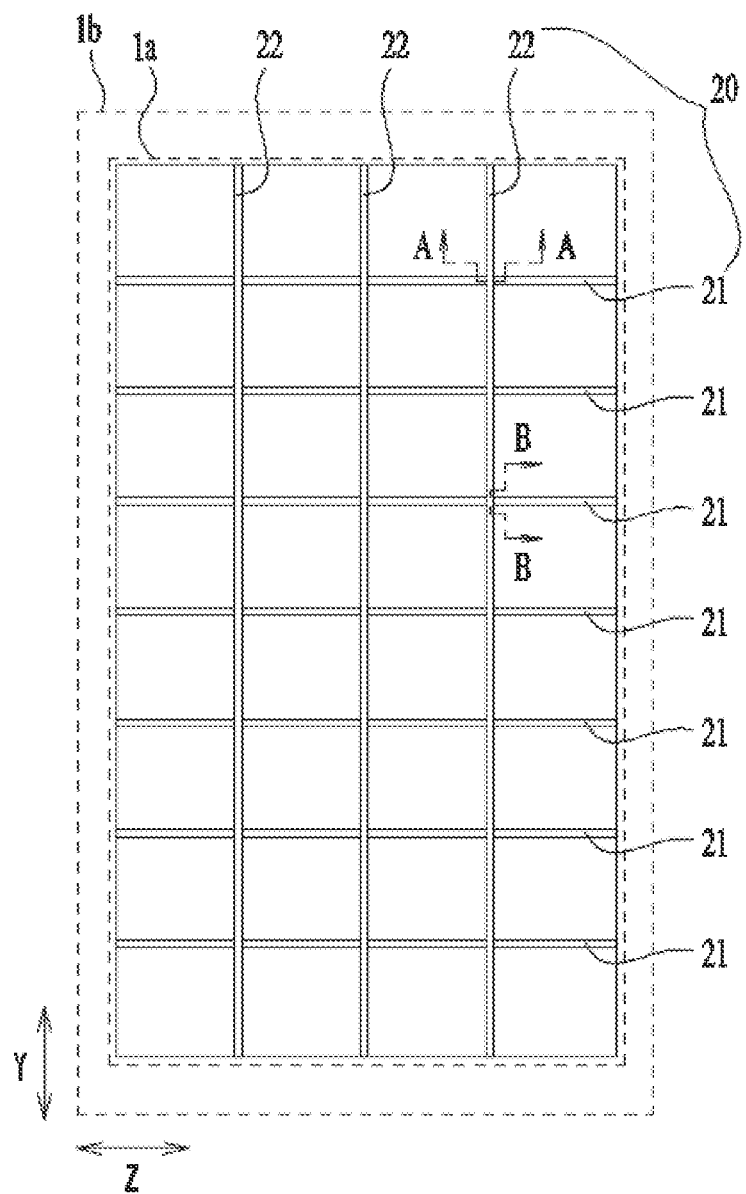
FIG. 1 is a top view schematic structural diagram of a touch panel according to an embodiment of the present application.

In the drawings, the drawings are not drawn to actual scale.

DETAILED DESCRIPTION

The applicant found that the wiring region of the touch panel is provided with an entire inorganic material layer, the inorganic material layer is mainly made of inorganic materials, and the inorganic materials include one or more of silicon nitride, silicon oxide, and silicon oxynitride. Generally, the inorganic material layer is configured to insulate and protect the electrode layer. However, due to the high modulus of the inorganic material layer made of inorganic materials, the tensile limit is low, and the bending resistance is relatively weak. During the bending test, the entire inorganic material layer bears too much tensile stress in the bending region, which is prone to breakage. After breakage of the inorganic material layer, it is easy to further cause breakage of the electrode layer due to the large tensile stress, thereby leading to the problem of the touch function failure. Based on the above problems found by the applicant, the embodiments of the present application provide a touch panel with integrated bending and touch functions, which can reduce the breakage risk of the electrode layer.

Figure 2:
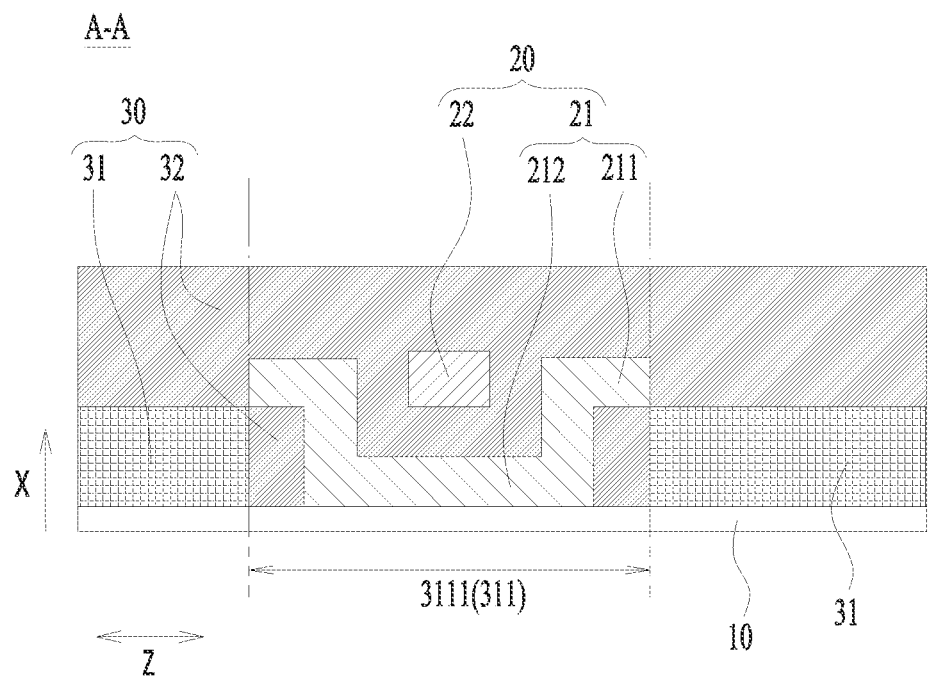
FIG. 2 is a cross-sectional schematic structural diagram along A-A in FIG. 1.

As shown in FIGS. 1 and 2, the touch panel 1 provided by the embodiments of the present application includes a touch region 1a and a peripheral region 1b arranged around the touch region 1a. When the touch panel 1 is used for a display panel, it is usually disposed on a packaging layer of the display structure, such as a thin film packaging layer. The touch panel 1 includes a substrate 10, an electrode layer 20 disposed on the substrate 10, and an insulating layer 30. The electrode layer 20 includes a plurality of second electrodes 21 and a plurality of first electrodes 22 arranged to intersect with the second electrodes 21, and capacitors can be formed at the intersections to determine the touch positions.

The second electrodes 21 and the first electrodes 22 are insulated by the insulating layer 30. The insulating layer 30 includes an inorganic material layer 31 and an organic material layer 32. The inorganic material layer 31 is provided with openings 311 at least corresponding to intersections of the second electrodes 21 and the first electrodes 22. A part of the organic material layer 32 fills in the openings 311. The arrangement of the organic material layer 32 and the inorganic material layer 31 can ensure the bendable performance of the touch panel 1. Openings 311 are provided on the inorganic material layer 31, so that the stress transfer between portions of the inorganic material layer 31 on both sides of the opening 311 is difficult to be realized. That is, when the inorganic material part on a side of the opening 311 is subjected to tensile stress, the tensile stress is not easily transferred to the inorganic material part on the other side of the opening 311. Because that the flexibility of the organic material layer 32 itself is good, when subjected to tensile stress, it is easy for the organic material layer 32 to absorb the tensile stress through its own deformation. Therefore, the organic material layer 32 has strong bending resistance and is not easy to break, which can relieve the stress between the inorganic material layer 31 and the electrode layer 20. Thus, it is not easy to transfer stress between the inorganic material parts on both sides of the opening 311 through the organic material layer 32. When bending the touch panel 1 of the embodiments of the present application, the tensile stress beared by the inorganic material itself is small, thereby reducing the possibility of breakage of the inorganic material layer, and thus reducing the possibility of the touch function failure caused by breakage of the electrode layer 20.

In some embodiments, a part of the organic material layer 32 covers a side of the electrode layer 20 away from the substrate 10, which can ensure the protection of the electrode layer 20. Exemplarily, the part of the organic material layer 32 covering the side of the electrode layer 20 away from the substrate 10 is a structure distributed continuously throughout the entire layer.

In some embodiments, the electrode layer 20 is connected to a driving IC (not shown in the figure) through the conductive wire disposed in the peripheral region 1*b*. The conductive wire is configured to transmit a touch driving signal from the driving IC to the electrode layer 20, and transmit a touch sensing signal generated by the electrode layer 20 back to the driving IC through the same conductive wire, thereby realizing the touch function requirement of the touch panel 1. Exemplarily, one of the second electrode 21 and the first electrode 22 is a touch driving electrode, and the other is a touch sensing electrode. When an excitation signal is applied to the touch driving electrode through the conductive wire, due to the existence of capacitance, the excitation signal can be sensed and received on the touch sensing electrode, and the magnitude and phase shift of the received signal are related to the frequency of the excitation signal and the size of the capacitance. That is, the determination of the touch position can be determined by the capacitance between the touch driving electrode and the touch sensing electrode.

In some embodiments, the second electrodes 21 are spaced apart along a column direction Y, and the first electrodes 22 are spaced apart along a row direction Z, so that the second electrodes 21 and the first electrodes 22 form a net structure.

In some embodiments, the second electrode 21 may be a strip metal wire, and the first electrode 22 may be a strip metal wire. Optionally, the second electrode 21 extends in the row direction Z, and the first electrode 22 extends in the column direction Y. The material of the strip metal wire is selected from metal materials such as nanometer silver wire, copper, annealed copper, gold, and aluminum.

In some embodiments, the organic material layer 32 may be made of materials such as organic glue.

In some embodiments, as shown in FIG. 2, the openings 311 of the inorganic material layer 31 include a plurality of first openings 3111 extending in the column direction Y, and an orthographic projection of the first opening 3111 in a thickness direction X covers an orthographic projection of the first electrode 22 in the thickness direction X. Therefore, the first opening 3111 corresponds to the entire first electrode 22. Further, the increase of the size of the opening 311 in the column direction Y is beneficial to arrange more organic materials in the opening 311, and is beneficial to further reduce the transfer of the tensile stress between the inorganic material parts on both sides of the opening 311. Therefore, the overall bendable performance of the touch panel 1 is improved.

Figure 3:
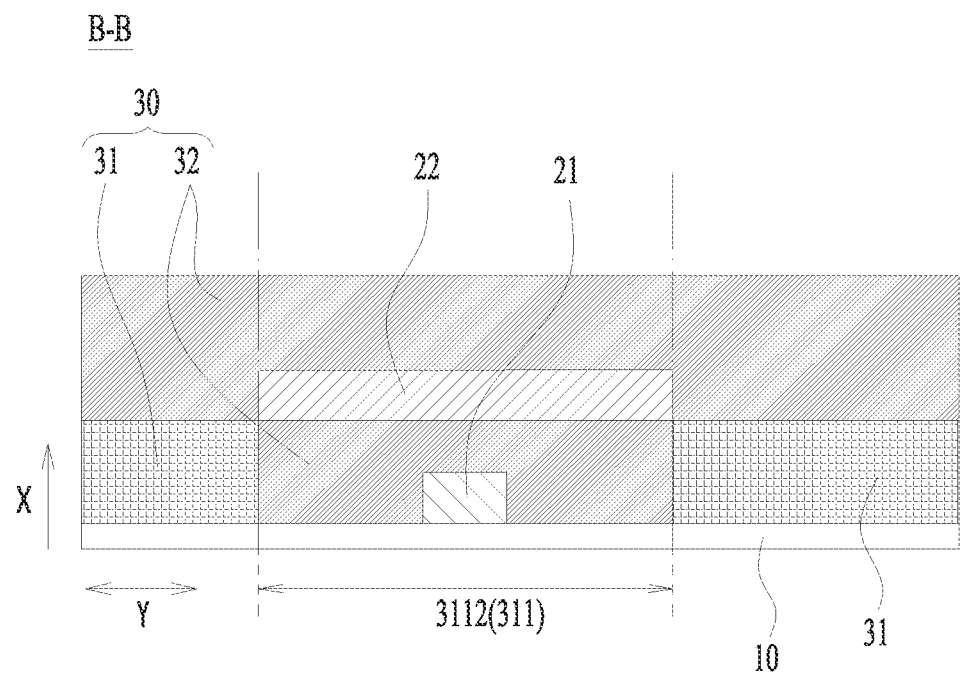
FIG. 3 is a cross-sectional schematic structural diagram along B-B in FIG. 1.

In some embodiments, as shown in FIG. 3, the openings 311 of the inorganic material layer 31 further include a plurality of second openings 3112 extending in the row direction, and an orthographic projection of the second opening 3112 in the thickness direction X perpendicular to the surface of the substrate 10 covers an orthographic projection of the second electrode 21 in the thickness direction X. Therefore, the second opening 3112 of the inorganic material layer 31 corresponds to the entire second electrode 21. Further, the increase of the size of the opening 311 in the row direction Z is beneficial to arrange more organic materials in the opening 311, and is beneficial to further reduce the transfer of the tensile stress between the inorganic material parts on both sides of the opening 311. Therefore, the overall bendable performance of the touch panel 1 is improved.

The plurality of first openings 3111 and the plurality of second openings 3112 are arranged to intersect with each other, so as to form a grid structure of the openings 311 intersecting with each other in the row direction and the column direction. Therefore, the portions of the inorganic material layer 31 separated by the plurality of first openings 3111 and the plurality of second openings 3112 form independent rectangular regions of inorganic materials.

In some embodiments, the openings 311 may only include ones of the plurality of first openings 3111 and the plurality of second openings 3112 as described above.

Figure 4:
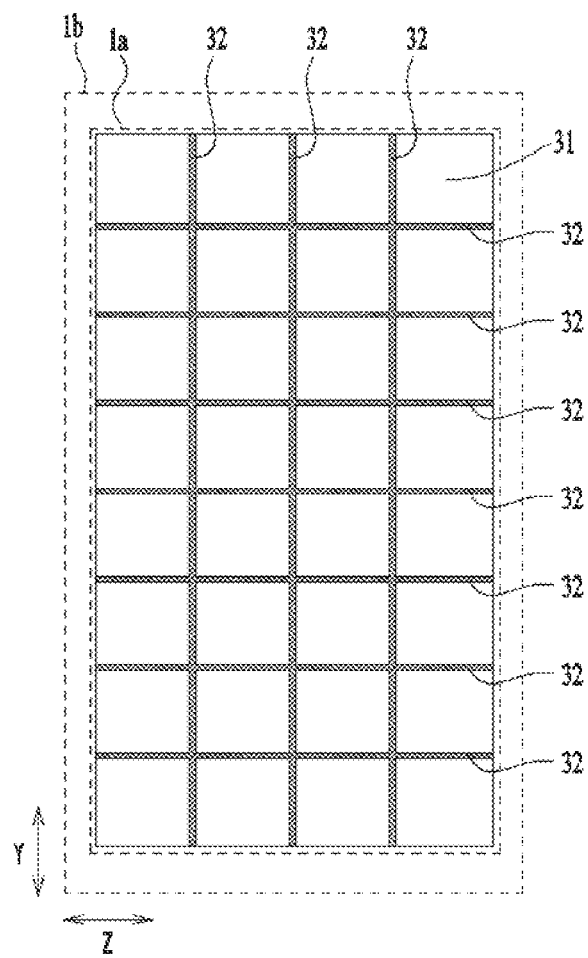
FIG. 4 is a local schematic structural diagram of a touch panel according an embodiment of the present application.

As shown in FIG. 4, since the openings 311 form a grid structure, the organic material layer 32 filled in the openings 311 also forms a grid structure, so that the tensile limit of the organic material layer 32 is further improved, and the bending resistance is further improved. At the same time, the stress of the gridded organic material layer 32 on the electrode layer 20 is also reduced, and the force on the electrode layer 20 is reduced, thereby reducing the breakage risk.

In some embodiments, as shown in FIG. 2, a size of the first opening 3111 in the row direction Z is greater than a size of the corresponding first electrode 22 in the row direction Z. Therefore, the orthographic projection of the first electrode 22 in the thickness direction X is located within the orthographic projection of the first opening 3111 in the thickness direction X. Thus, a distance between the first electrode 22 and the inorganic material layer 31 is relatively large, and more organic materials are arranged between the first electrode 22 and the inorganic material layer 31. When the touch panel 1 is bent, the tensile stress on the inorganic material layer 31 is not easily transferred to the first electrode 22, and the first electrode 22 can follow the deformation of the organic material, thereby reducing the possibility of breakage of the first electrode 22 due to large tensile stress.

In some embodiments, as shown in FIG. 3, a size of the second opening 3112 in the column direction Y is greater than a size of the corresponding second electrode 21 in the column direction Y. Therefore, the orthographic projection of the second electrode 21 in the thickness direction X is located within the orthographic projection of the second opening 3112 in the thickness direction X. Thus, a distance between the second electrode 21 and the inorganic material layer 31 is relatively large, and more organic materials are arranged between the second electrode 21 and the inorganic material layer 31. When the touch panel 1 is bent, the tensile stress on the inorganic material layer 31 is not easily transferred to the second electrode 21, and the second electrode 21 can follow the deformation of the organic material, thereby reducing the possibility of breakage of the second electrode 21 due to large tensile stress.

In some embodiments, as shown in FIG. 2, each second electrode 21 includes a pair of connecting portions 211 and a bridge portion 212 connected between the pair of connecting portions 211. The connecting portions 211 and the first electrode 22 are arranged in a same layer, which can simplify the forming process of the touch panel 1. At an intersection of the second electrode 21 and the first electrode 22, the bridge portion 212 is located on a side of the first electrode 22 close to the substrate 10, and at least a part of the bridge portion 212 is located within the opening 311. In some examples, the second electrode 21 and the first electrode 22 are respectively formed in two metal layers. The connecting portions 211 and the first electrode 22 are arranged in the same layer of the two metal layers, and the bridge portion 212 is formed in the other layer of the two metal layers.

In some examples, there is a gap between the bridge portion 212 and the inorganic material layer 31. A part of the organic material layer 32 fills in the gap, so that the electrode layer 20 is covered by the organic material layer 32. Therefore, when the touch panel 1 is bent, the tensile stress on the inorganic material layer 31 is not easily transferred to the bridge portion 212, thereby reducing the possibility of breakage of the bridge portion 212 due to large tensile stress.

In some embodiments, the substrate 10 includes an organic buffer layer, which is beneficial to improve the flexibility of the substrate 10. Therefore, the substrate 10 has good bendable performance, which reduces the difficulty of bending, and reduces the possibility of breakage of the bent substrate 10 due to large internal tensile stress. Exemplarily, the organic buffer layer may be made of materials such as organic glue.

Figure 5:
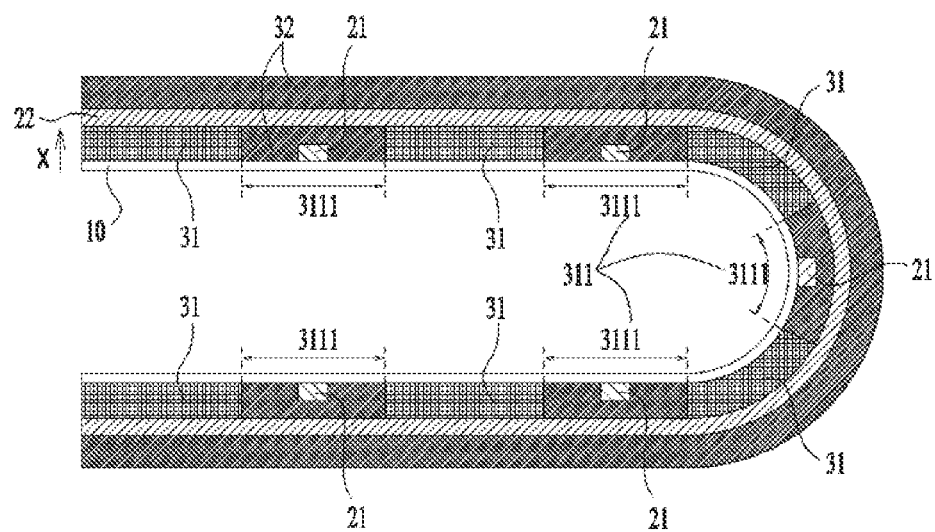
FIG. 5 is a local cross-sectional schematic structural diagram of a touch panel in a bending state according an embodiment of the present application.

Exemplarily, the touch panel 1 is bent as shown in FIG. 5. When the touch panel 1 of the embodiments of the present application is bent, the openings 311 opened on the inorganic material layer 31 can relieve the stress of the inorganic material parts on both sides of the opening 311. Therefore, the internal tensile stress of the inorganic material parts on both sides of the opening 311 is reduced, and the possibility of breakage of the inorganic material layer 31 is reduced. Since the proportion of the organic material layer 32 increases, the overall flexibility of the touch panel 1 is improved, and the overall bendable performance of the touch panel 1 is improved. In the bent touch panel 1, the tensile stress beared by the second electrode 21 and/or the first electrode 22 in the electrode layer 20 is small, thereby reducing the possibility of breakage of the second electrode 21 and/or the first electrode 22.

The embodiments of the present application further provide a display panel. The display panel includes the touch panel 1 provided by the above embodiments, which can meet the touch and bending requirements of the display panel, and can reduce the possibility of failure of the display panel due to an open circuit of the touch panel during the reliability test or operation process of the display panel.

In some embodiments, the display panel provided by the embodiments of the present application further includes a display structure. The display structure includes an array substrate, a light emitting device layer and a packaging layer, wherein the array substrate, the light emitting device layer and the packaging layer are stacked. The packaging layer may be a thin film packaging layer, and may be disposed on a side of the light emitting device layer away from the array substrate. The touch panel 1 is arranged in contact with the packaging layer through the substrate 10.

The embodiments of the present application further provide a display device. The display device includes the display panel provided by the above embodiments. The display device may be any product or component with a display function such as a mobile phone, a tablet computer, a notebook computer, a digital photo frame, or a navigator, and may be integrated with a photosensitive component such as a camera. Since the display device provided by the embodiments of the present application includes the display panel in any of the above embodiments, it has advantages that the inorganic material layer 31 and the electrode layer 20 are not easily broken, and have high safety.

What is claimed is:

1. A touch panel, comprising:
a substrate;
an electrode layer disposed on the substrate, wherein the electrode layer comprises a plurality of second electrodes and a plurality of first electrodes arranged to intersect with the second electrodes; and
an insulating layer, wherein the second electrodes and the first electrodes are insulated by the insulating layer, the insulating layer comprises an inorganic material layer and an organic material layer, wherein the inorganic material layer is provided with openings at least corresponding to intersections of the second electrodes and the first electrodes, and a part of the organic material layer fills in the openings.

2. The touch panel according to claim 1, wherein
the openings of the inorganic material layer comprise a plurality of first openings extending in a column direction, and an orthographic projection of the first opening in a thickness direction perpendicular to a surface of the substrate covers an orthographic projection of the first electrode in the thickness direction; or
the openings of the inorganic material layer comprise a plurality of second openings extending in a row direction, and an orthographic projection of the second opening in a thickness direction perpendicular to a surface of the substrate covers an orthographic projection of the second electrode in the thickness direction.

3. The touch panel according to claim 1, wherein the openings of the inorganic material layer comprise a plurality of first openings extending in a column direction and a plurality of second openings extending in a row direction, an orthographic projection of the first opening in a thickness direction perpendicular to a surface of the substrate covers an orthographic projection of the first electrode in the thickness direction, and an orthographic projection of the second opening in the thickness direction perpendicular to the surface of the substrate covers an orthographic projection of the second electrode in the thickness direction.

4. The touch panel according to claim 3, wherein the first opening is arranged corresponding to the entire first electrode, the second opening is arranged corresponding to the entire second electrode, the plurality of first openings and the plurality of second openings are arranged to intersect with each other so as to form a grid structure of the openings intersecting with each other in the row direction and the column direction.

5. The touch panel according to claim 3, wherein a size of the first opening in the row direction is greater than a size of the corresponding first electrode in the row direction; and/or,
a size of the second opening in the column direction is greater than a size of the corresponding second electrode in the column direction.

6. The touch panel according to claim 1, wherein the second electrode comprises a pair of connecting portions and a bridge portion connected between the pair of connecting portions, and the connecting portions and the first electrode are arranged in a same layer, wherein at an intersection of the first electrode and the second electrode, the bridge portion is located on a side of the first electrode close to the substrate, and at least a part of the bridge portion is located within the opening.

7. The touch panel according to claim 6, wherein the second electrode and the first electrode are respectively formed in two metal layers, wherein the connecting portions and the first electrode are arranged in the same layer of the two metal layers, and the bridge portion is formed in the other layer of the two metal layers.

8. The touch panel according to claim 6, wherein there is a gap between the bridge portion and the inorganic material layer, and a part of the organic material layer fills in the gap.

9. The touch panel according to claim 1, wherein the second electrodes are spaced apart along a column direction, the first electrodes are spaced apart along a row direction, and the second electrodes and the first electrodes are arranged to intersect with each other to form a net structure.

10. The touch panel according to claim 1, wherein the second electrode is a strip metal wire; and the first electrode is a strip metal wire.

11. The touch panel according to claim 9, wherein the second electrode extends in the row direction; and the first electrode extends in the column direction.

12. The touch panel according to claim 1, wherein one of the second electrode and the first electrode is a touch driving electrode and the other is a touch sensing electrode.

13. The touch panel according to claim 1, wherein a part of the organic material layer covers a side of the electrode layer away from the substrate.

14. The touch panel according to claim 1, wherein the substrate comprises an organic buffer layer.

15. A display panel comprising an array substrate, a light emitting device layer, a packaging layer, and a touch panel, wherein the array substrate, the light emitting device layer, the packaging layer, and the touch panel are stacked; the touch panel is arranged in contact with the packaging layer through the substrate,
wherein the touch panel comprises:
  a substrate;
  an electrode layer disposed on the substrate, wherein the electrode layer comprises a plurality of second electrodes and a plurality of first electrodes arranged to intersect with the second electrodes; and
  an insulating layer, wherein the second electrodes and the first electrodes are insulated by the insulating layer, and the insulating layer comprises an inorganic material layer and an organic material layer, wherein the inorganic material layer is provided with openings at least corresponding to intersections of the second electrodes and the first electrodes, and a part of the organic material layer fills in the openings.

16. A display device comprising a display panel, wherein the display panel comprises an array substrate, a light emitting device layer, a packaging layer, and a touch panel, wherein the array substrate, the light emitting device layer, the packaging layer, and the touch panel are stacked; the touch panel is arranged in contact with the packaging layer through the substrate,
wherein the touch panel comprises:
  a substrate;
  an electrode layer disposed on the substrate, wherein the electrode layer comprises a plurality of second electrodes and a plurality of first electrodes arranged to intersect with the second electrodes; and
  an insulating layer, wherein the second electrodes and the first electrodes are insulated by the insulating layer, and the insulating layer comprises an inorganic material layer and an organic material layer, wherein the inorganic material layer is provided with openings at least corresponding to intersections of the second electrodes and the first electrodes, and a part of the organic material layer fills in the openings.

* * * * *